United States Patent [19]

Simpson

[11] Patent Number: 4,894,573

[45] Date of Patent: Jan. 16, 1990

[54] ROTARY ELECTRICAL MACHINES

[75] Inventor: John Simpson, Whitley Bay, England

[73] Assignee: Northern Engineering Industries PLC, Newcastle Upon Tyne, England

[21] Appl. No.: 281,831

[22] Filed: Dec. 8, 1988

[30] Foreign Application Priority Data

Dec. 11, 1987 [GB] United Kingdom ............... 8729045
Aug. 30, 1988 [GB] United Kingdom ............... 8820485

[51] Int. Cl.$^4$ .................. H02K 5/04; H02K 15/02
[52] U.S. Cl. .................................... 310/217; 310/42; 310/89; 310/216; 310/254; 29/596
[58] Field of Search .............. 310/89, 91, 42, 216, 310/217, 254, 259; 29/596, 732

[56] References Cited

U.S. PATENT DOCUMENTS

| 4,082,974 | 4/1978 | Yamamoto et al. | 310/179 |
|---|---|---|---|
| 4,227,109 | 10/1980 | Mulach | 310/258 |
| 4,290,291 | 9/1981 | Burns | 72/316 |
| 4,587,722 | 5/1986 | Miller | 29/596 |

FOREIGN PATENT DOCUMENTS

| 0157990 | 12/1987 | European Pat. Off. | |
|---|---|---|---|
| 2158211 | 5/1973 | Fed. Rep. of Germany | 29/596 |
| 956080 | 4/1964 | United Kingdom . | |
| 2059177 | 4/1981 | United Kingdom . | |
| 2188792 | 10/1987 | United Kingdom . | |

OTHER PUBLICATIONS

H. Hasse et al., "Air-Cooled Turbogenerators In The 200 MVA Power Class", Brown Boveri Review, 3-86, pp. 133-138. vol. 73 #3 Mar. 1986.
B. A. Marlow, "The Mechanical Design of Large Generators", Proceedings of the Institute of Mechanical Engineers, Nov. 1986, vol. 200, No. 135, pp. 1-9.

Primary Examiner—Patrick R. Salce
Assistant Examiner—Judson H. Jones
Attorney, Agent, or Firm—Rosen, Dainow & Jacobs

[57] ABSTRACT

A large scale horizontal axis rotary electrical machine has a stator with a laminated annular core resting upon an open-topped support structure. At one position along its length the core is axially fixed to the support structure but is otherwise free to move axially on the structure to accommodate differential thermal movements. Clamping means for the core laminations incorporate springs the allow the core to expand axially. The stator windings are axially slidable in slots in the laminated core and are held by respective winding end supports spaced from the ends of the core, whereby differential thermal expansion is accommodated between the core and the windings. By adoption of the open-topped support structure, assembly of the core can be accelerated by lowering individual lamination stampings or pre-assembled biscuits of such stampings onto the structure while the structure remains in a horizontal position.

15 Claims, 3 Drawing Sheets

ROTARY ELECTRICAL MACHINES

BACKGROUND OF THE INVENTION

This invention relates to large rotary electrical machines, e.g. with ratings of 1 MW and upwards, having a generally horizontal axis of rotation.

Large rotary electrical machines, for example generators of turbine-generator sets, have a stator construction comprising a generally annular outer casing which carries the stator core and the stator winding either directly or through an inner annular core frame (see "The Mechanical Design of Large Turbogenerators", B. A. Marlow, Proc. Instn. Mech. Engrs., Vol. 200 (1986) No. 135). In each case outer casing or the core frame has struts extending radially inwards that provide support and location for the core laminations. Heavy end plates, sometimes secured together by through bolts, hold the laminations together under a relatively high compressive force in order to limit axial thermal expansion and vibration.

To assemble such cores, the outer casing or the core frame, as the case may be, is first constructed and is fitted with one end plate. It is then stood with its axis vertical and the end plate lowermost so that the laminations, usually in segmental form, can be dropped individually into the frame and fitted into place. The other end plate can then be added and the core laminations clamped, after which the core frame is returned to a horizontal position for the remaining assembly operations, including fitting the windings. The construction of the core frame and fitting the core laminations into it, which typically can take 16-20 weeks for a 500 MW generator, adds significantly to the costs of manufacture as well as requiring significant capital investment for plant capable of handling the core frame during the various operations.

SUMMARY OF THE INVENTION

According to one aspect of the present invention, there is provided a rotary electrical machine comprising a stator having an annular core comprising laminations held under compression between end plates, a rotor extending through the core and mounted for rotation about a horizontal axis, the stator core resting on an open-topped support structure having supports that engage downwardly directed faces of the core on opposite sides of a vertical plane through said axis, whereby the core laminations can be assembled on the support structure by lowering them transversely onto said supports transversely to the axis of rotation.

By employing such an arrangement a substantial reduction of assembly time can be achieved. The assembly space can be arranged to be accessible both from the sides and from above, simplifying the task of bringing the laminations into position. The stator supports are conveniently disposed below the axis of rotation to cooperate with downwardly directed faces of the stator core that are part of a regular polygonal or circular cross-section of the core.

It is also known to reduce the time for assembly of a large stator core by producing pre-assembled toroidal packets of laminations which are commonly referred to as "biscuits". By this means it is no longer necessary to fit each lamination into the core frame individually so much time can be saved. A complication arises, however, in that differential expansion between the core and its frame can impose considerable stresses. Such expansion is relatively easily accommodated when the core is built up from individual laminations, because the inherent non-planarity of the laminations gives the core an enhanced flexibility, but biscuits, being composed of pre-compressed packets of laminations, have a much higher coefficient of thermal expansion and it may not be possible to substitute them directly for individual laminations. To limit expansion stresses, mixtures of biscuits and laminations may be used, but in a conventional stator construction that would reintroduce the disadvantages already mentioned.

The support structure of the present invention, however, allows the core to be mounted in a manner that avoids this problem, by arranging that the core is axially engaged with the support structure at a location along its length and is otherwise free to move axially relative thereto, whereby relative thermal movement between the core and the structure can occur relatively freely.

Indeed, such an arrangement can be employed more generally, and according to a further aspect of the invention there is provided a rotary electrical machine comprising a support structure, a stator on said structure and a rotor extending through the stator and mounted for rotation about a horizontal axis, the stator having an annular core through which the rotor extends and comprising core laminations held under compression between end plates of the stator, stator windings being mounted in the core, the core being axially engaged with the support structure at a location along its length and being otherwise free to move axially relative thereto, whereby relative thermal movement is permitted between the core and the structure, and that the stator windings are held by means permitting relative thermal movement between the windings and the core axially of the machine.

The concept of freedom for thermal movements can be taken further in accordance with another aspect of the invention, in which there is provided a rotary electrical machine comprising a support structure, a stator on said structure and a rotor extending through said stator and mounted for rotation about a horizontal axis, the stator having an annular core through which the rotor extends and which comprises core laminations clamped together axially, the core carrying stator windings that extend axially from both ends of the core where they are held by end winding supports, the windings being mounted in the core in a manner permitting relative thermal movement therebetween axially of the core, said end winding supports being mounted on tension elements extending the length of the stator and carrying first and second groups of clamping elements, the first group clamping elements securing the end winding supports on the ends of the tension elements and the second group of clamping elements securing the core laminations between and spaced from said end winding supports, said second group applying said axial clamping pressure to the core laminations, and spring means being provided on the tension elements to permit relative axial movement between said first and second groups of clamping elements at least at one end of the stator.

This arrangement for permitting thermal movements between the windings and the core in the axial direction can also be employed in otherwise conventional rotary electrical machines, i.e. independently of whether there is provision for relative thermal movement between the core and its support structure.

By way of example only, the invention will be described in more detail with reference to the accompanying diagrammatic drawings.

DESCRIPTION OF THE PREFERRED EMBODIMENT

Figure 1:
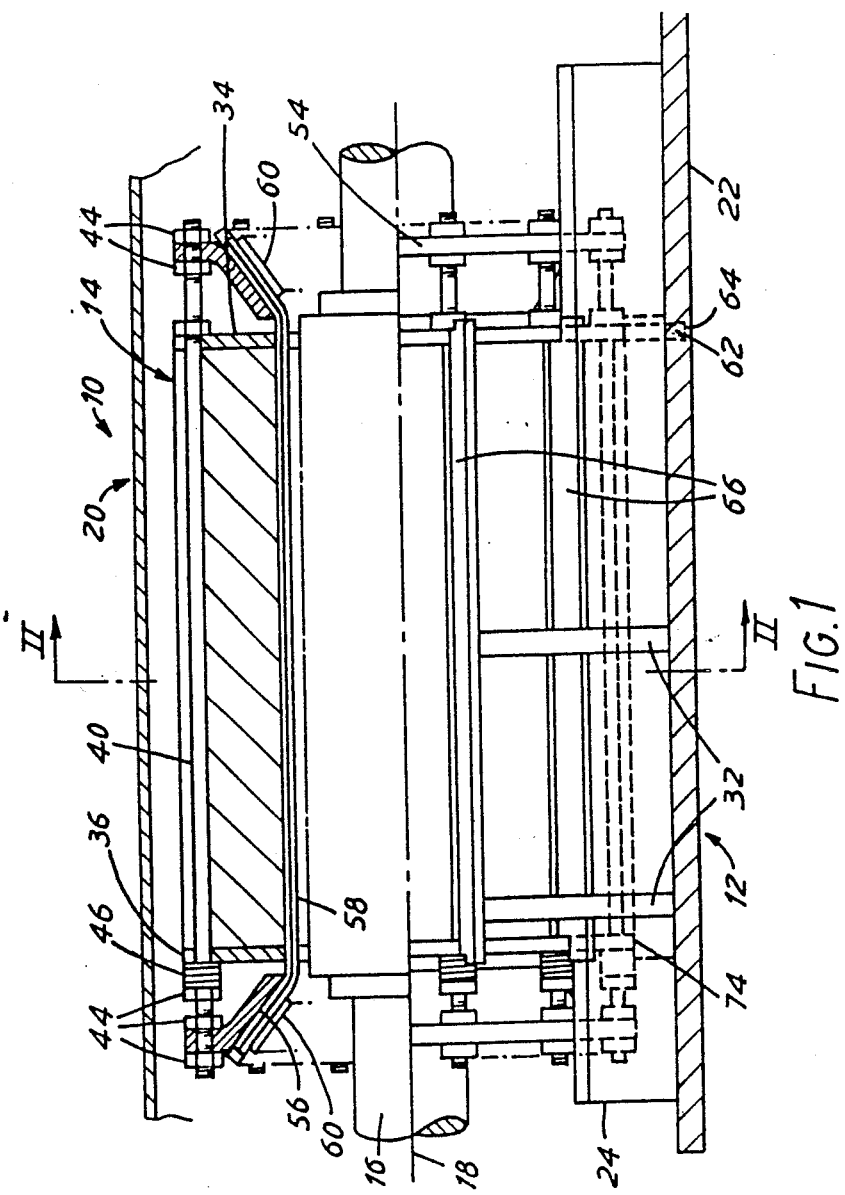
FIGS. 1 and 2 are side and end views of a stator/rotor assembly of an electrical machine according to the invention, FIG. 1 being partly sectioned on the line I—I in FIG. 2 and FIG. 2 being partly sectioned on the line II—II in FIG. 1.

The drawings illustrate a generator 10 having a support structure 12, an annular stator core 14 supported on the structure, a rotor 16 extending through the core and mounted on bearings (not shown) for rotation about a horizontal axis 18, and a fluid-tight housing 20 encasing the stator and rotor.

The support structure 12 comprises a base member 22 upon which there are fixed upstands in the form of two support beams 24, one located on each side of the central axial plane 26 of the generator and running parallel to the rotary axis to extend along the full length of the core 14. The core has a regular polygonal cross-section and rests through two downwardly directed faces of that cross-section on top webs 28 the beams 24 and is separated from them by low-friction material 30, such as polytetrafluoroethylene. Two axially spaced core support cradles 32 are also mounted on the base member 22. The cradles 32 each have a profile facing the core 14 which is shaped to conform generally to the opposed peripheral region of the core 14, but preferably there is normally a small clearance between them and the core.

The core 14 comprises two end plates 34,36 between which are clamped a plurality of biscuits 38 (not shown individually) of pre-assembled core laminations. The clamping pressure is applied by tie bolts 40 extending axially through recesses 42 in the periphery of the laminated body of the core and apertures in the end plates, nuts 44 being threaded on the bolts at both ends of the core. Springs 46 are mounted between the nuts and one end plate 36 to accommodate differential thermal movement between the bolts and the laminated core axially of the core. Restraint of this relative movement is minimised by ensuring that there are adequate radial clearances for the bolts and by using low friction material where required on sliding surfaces.

The tie bolts 40 extend beyond both ends of the stator core, their terminal portions being employed to mount frusto-conical end winding supports 54,56 which are secured at a spacing from the end plates 34,36 by further nuts 44 on the ends of the bolts 40. The stator windings 58, held in slots in the core, extend from the ends of the core and their end windings are secured on the supports 54,56 by clamps 60. The materials of the windings 58 and of the bolts 40 can be so chosen that it is not necessary to design for relative thermal movement between them. For example, windings of copper have a coefficient of expansion of $17 \times 10^{-6}/°C.$, with which can be employed bolts of austenitic steel which has a coefficient of $18 \times 10^{-6}/°C.$ Both end plates 34,36 of the core have lower extensions 34a,36a respectively, that are a free sliding fit between the beams 24. The sides of the extensions are preferably vertical or taper downwardly so that the end plates can be lowered into place. One end plate 34 of the core is axially fixed on the support structure 12. For this purpose, the end plate has an integral key formation 62 which engages a slot 64 in the base member 22. Additionally, the end plate is firmly anchored to the beams 24, for example by bolted brackets (not shown) or welding. The remainder of the core is free to expand and contract axially on the beams 24 under the influence of thermal effects. The low-friction material 30 is preferably fixed to the core face so that it slides with the core, thereby preventing damage to the edges of the laminations. Such movement relative to the tie bolts is possible because of the provision of the springs 46. Relative axial movement is also possible between the stator windings and the core, the windings being located by the end winding supports substantially independently of axial movements of the core itself. It is preferably at the end winding support 54, adjacent the fixed end plate 34, that the stator end windings extend to connectors (not shown) for connection to external conductors (not shown) in known manner. With these measures, although biscuits are used to build up the core, with a consequent high thermal expansion rate of the main body of the core, the axial forces imposed on the windings remain minimal.

The mass of the stator core may be sufficient to allow it to rest stably on the supporting slides, uninfluenced by torques arising from the electromagnetic forces imposed during operation. Similarly lifting of the free end of the core, remote from the end plate is resisted by the core mass. The polygonal cross-section of the core and the conforming profile of the support structure facing it, in particular the cradles 32, can of course resist any tendency of the core to turn on its axis. Local resistance against rotation and lifting can be offered by the extensions 34a,36a of the end plates. In addition, it is preferred, to provide keying means which give a positive restraint along the length of the core against such displacements. Illustrated are axial keys 66 which extend between keyways 68 in the cradles 32 and the adjoining recesses 42 in the biscuits, these recesses extending into the end plates 34,36. Additionally or alternatively, the axially displaceable end plate 36 has a pair of wedge-shaped keyways 72 which engage dovetail key blocks 74 secured to the facing side surfaces of the beams 24 so that the end plate 36 serves to guide the axial movements of the core.

The outer peripheries of the end winding supports 54,56 can also engage the beams 24 slidably, and possibly be supported by the beams. This, and also the mounting of the end winding supports at a spacing from the stator core helps to isolate the windings 58 from axial movements of the core 14 and assisting in the control of vibration. The support 54 can additionally oro alternatively be in contact with the end plate 34.

The stator can be assembled on the support structure 12 by lowering the end plates 34,36 and the core biscuits 38 into position on the horizontal support beams 24, this being facilitated by the fact that there is open access on both sides of the structure 12 as well as from above, and the assembled elements of the core are clamped together by the tie bolts 40. It is also possible to assemble individual annular laminations on the support structure to build up the core, although that would take longer. The stator winding end rings 54,56 can then be secured on the ends of the through bolts, the windings 58 inserted in their slots in the assembled core, and the ends of the windings secured to the end rings and the windings electrically coupled.

Figure 2:
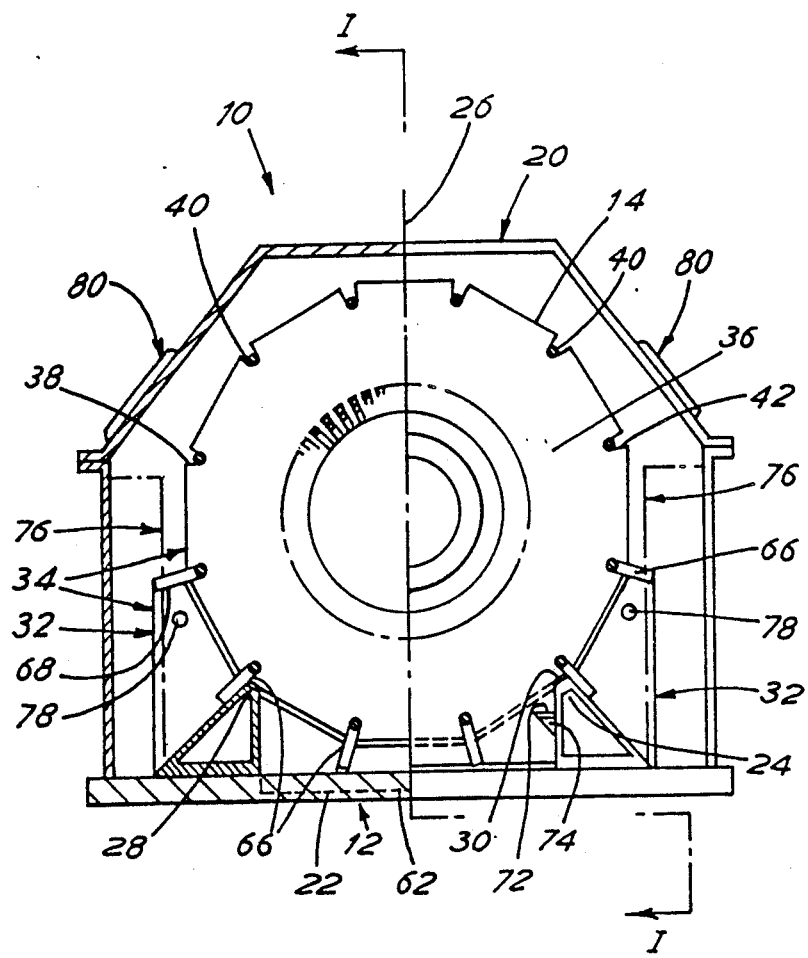

Other components of the stator, such as coolant circulation means (not shown), may be put in place before or after the building of the core, as convenient. The core laminations will of course have further aligned slots, holes etc., in the conventional manner, for such purposes as the flow of coolant fluid. Coolers for the circulating coolant fluid can be located in any convenient place, for example, within the housing alongside the core and between the cradles, and between the central cradle 32 and the end plate 34 as shown in ghost outline at 76 in FIG. 2.

For the damping of stator vibrations that occur in operation from the electromagnetic excitation of the stator by the rotor, insertions (not shown) of rubber or other suitable damping material can be put at appropriate locations, e.g. between the core and the low friction material 30 and also between the fixed end plate 34 and the main body of the stator core. In addition, anti-vibration devices, known per se, can be connected between the core and the base member 22. It may be preferred, in order to isolate the housing and rotor bearings as far as possible from the stator vibrations, to mount the housing 20 and the rotor bearings directly onto the foundations (not shown) on which the base member 22 will rest.

In the illustrated example, the housing 20 is mounted on the base member 22 together with the rotor bearings (not shown) that lie beyond the ends of the stator. Consequently, it is possible to move the generator as a self-contained unit. To that end, the cradles 32 have attachment points 78 for a lift harness, the points 78 being accessible via housing apertures normally closed by plates 80. It will be appreciated that the generator, when suspended from these points, derives considerable stiffness from the assembled core; this illustrates a further unique feature of the construction in that the core functions as a significant structural member.

The illustrated construction can be modified in many ways within the scope of the invention. For example, the tie bolts 40 are shown running in open slots in the periphery of the main body of the core, but they can be arranged on a pitch circle greater than the outside diameter of the core 14, the end rings 34,36 and the end winding supports 54,46 being furnished with apertured radial lugs to receive the bolts. The bolts can also be located on pitch circles of different diameters.

The anchoring of the core 14 relative to the support structure 12 need not be at an end of the core. By anchoring the core elsewhere, e.g. in the middle of its length, both ends can be left free to move axially. Furthermore, the anchoring of the core can be achieved in a number of ways. For example, a key can engage respective keyways formed in the base member 22 and the outer periphery of the core laminations intermediate the length of the core, a third cradle 32 being provided to support the fixed end of the core. Alternatively, a key can be formed integrally with the third cradle 32 adjacent that end of the core, the key engaging a keyway in the outer periphery of the core laminations.

Figure 3:
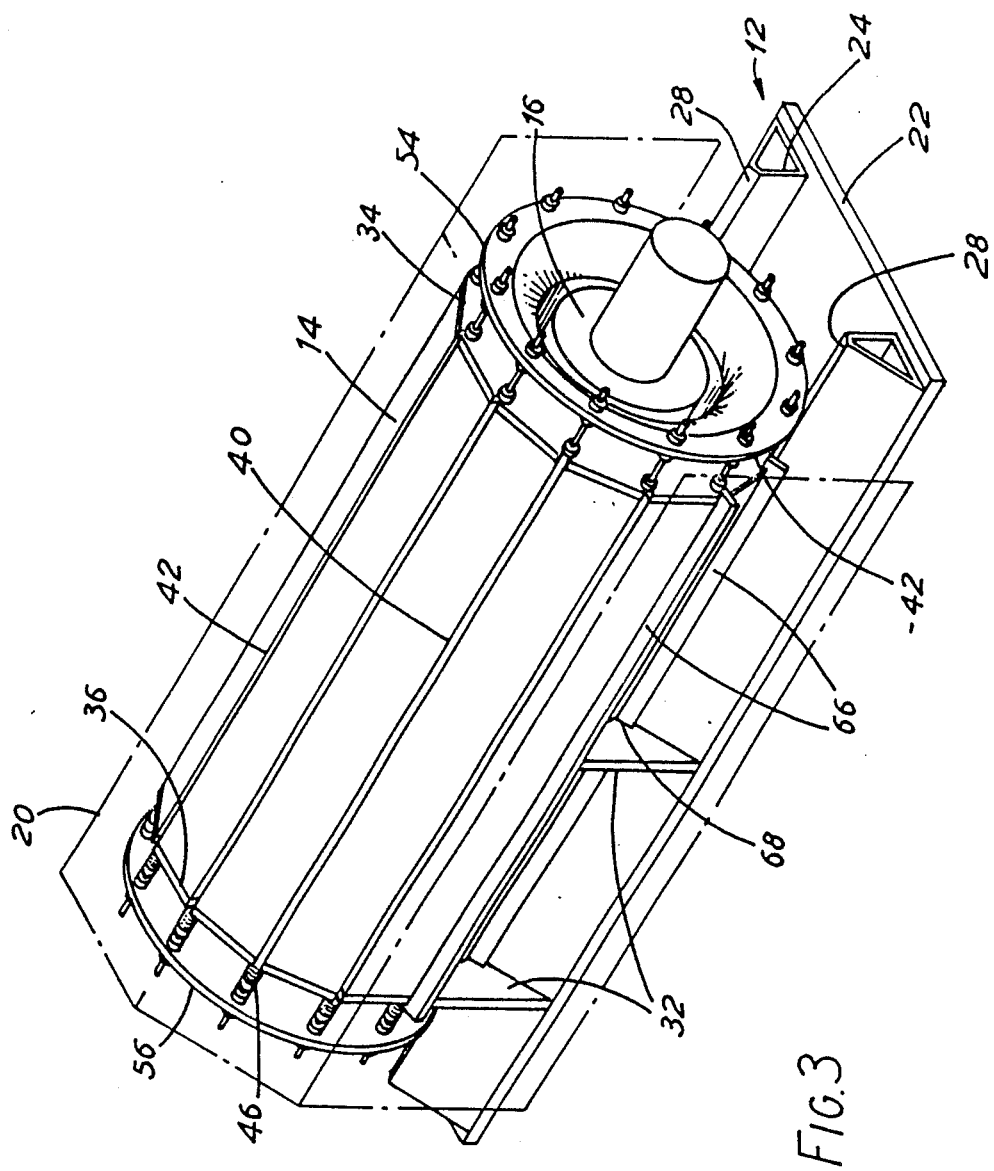
FIG. 3 is an isometric view illustrating schematically the support of the stator.

The support beams 24 are shown in FIG. 3 extending beyond the core, to support, for example, the generator exciter and the rotor bearings. However, it is also possible to dispense with the beams 24. In one alternative the core is mounted on bearing blocks resting on slideways carried by the cradles 32, the slideways being lubricated or faced with low-friction material. As another possibility, the cradles 32 are fixed relative to the core and are themselves slidable in slideways. In a further alternative, the core is mounted on relatively thin supports which can flex in the axial direction. Also, more closely analogous to the illustrated example, the core can be mounted on rollers to permit its axial expansion.

The external cross-section shape of the core is not limited to the dodecahedron shown and may, for example, be circular.

Although the foregoing description has been directed to a rotary electrical machine in the form of a generator, as will be appreciated by those skilled in the art the invention is equally applicable to motors and the term rotary electrical machine is to be construed accordingly.

I claim:

1. A rotary electrical machine having a stator, the stator comprising an annular core and a rotor extending through the core and mounted for rotation about a horizontal axis, the annular core comprising a series of laminations and respective end plates at opposite ends of the core, the laminations being held under compression between said end plates, the machine being further provided with an open-topped structure for assembly of the core, the core having downwardly directed faces on opposite sides of a vertical plane through the axis of rotation, said structure comprising supports that engage said downwardly directed faces, whereby the core laminations can be assembled on the structure by lowering them onto said supports with the structure horizontal.

2. A machine according to claim 1 wherein the end plates comprise elements that cooperate with the support structure to resist torque and/oro lift forces on the stator core.

3. A machine according to claim 1 wherein a portion of the core is axially engaged with the support structure at a location along its length and is otherwise displaceable axially relative thereto, whereby relative thermal movements can take place freely between the core and the support structure in the axial direction.

4. A machine according to claim 3 wherein the end plate at one end of the core comprises a keying projection engaging the support structure, whereby to provide said axial engagement.

5. A machine according to claim 3 wherein at least one axially extending key and keyway connection is provided between the support structure and the stator core for rotational and/or torsional restraint of the core on said structure, said key and keyway connection being slidably engaged to permit relative axial movement between the core and said structure.

6. A machine according to claim 1 wherein stator windings are carried by the core and mounting means for said windings in the core permit relative thermal movements between the windings and the core in the axial direction.

7. A machine according to claim 6 wherein a portion is axially engaged with the support structure at a location along its length and is otherwise displaceable axially relative thereto, whereby relative thermal movements can take place freely between the core and the support structure in the axial direction, and said axial engagement is provided at or adjacent an end of the core from which the core windings extend for connection to external electrical conductors.

8. A machine according to claim 1 wherein the support structure comprises respective beams on opposite sides of a vertical plane through the axis of rotation and acting as weight-bearing supports for the stator core along at least a substantial part of the length of the core, the core being axially slidably supported on said beams.

9. A machine according to claim 1 wherein the core has a non-circular cross-sectional profile and the support structure has elements on opposite sides of the vertical plane through the axis of rotation engaged by said elements for restraining rotational and/or torsional deflections of the core about an axial centre.

10. A machine according to claim 1 wherein tension elements extend axially through the core to hold the laminations in compression between the end plates, and spring means are provided for said tension elements to permit relative thermal movements between the core and the tension elements axially of the machine.

11. A machine according to claim 10 wherein stator winding supports are spaced from the end plates and the tension elements extend beyond the core end plates to provide mountings for said winding supports.

12. A machine according to claim 11 wherein the winding supports are in the form of substantially frusto-conical members concentric with the core, their smaller diameter ends projecting towards but being axially spaced from the core end plates.

13. A machine according to claim 10 wherein the core has an outer periphery and wherein slots open onto said outer periphery to provide locations for the tension elements whereby said elements can be inserted into place from the exterior by movement transversely to the rotary axis.

14. A rotary electrical machine comprising a support structure, a stator on said structure and a rotor extending through said stator and mounted for rotation about a horizontal axis, the stator having an annular core through which the rotor extends, the core comprising core laminations clamped together axially, stator windings carried by the core and extending axially from both ends of the core where they are held by end winding supports, the windings being mounted in the core in a manner permitting relative thermal movement therebetween axially of the core, tension elements of the core extending the length of the stator and providing mountings for said end winding supports, first and second groups of clamping elements on said tension elements, the first group of clamping elements securing the end winding supports on the ends of the tension elements and the second group of clamping elements securing the core laminations between and spaced from said end winding supports, said second group applying said axial clamping pressure to the core laminations, and spring means being provided on the tension elements to permit relative axial movement between said first and second group of clamping elements at least at one end of the stator.

15. A rotary electrical machine comprising a support structure, a stator on said structure and a rotor extending through the stator and mounted for rotation about a horizontal axis, the stator having an annular core through which the rotor extends, the core comprising core laminations and end plates between which said laminations are held under compression, stator windings being mounted in the core, means between the core and the support structure axially engaging the core with the support structure at a location along its length, further engagement means between the core and the support structure leaving the core otherwise free to move axially relative said structure, whereby relative thermal movement is permitted between the core and the structure, and means holding the stator windings in the core permitting relative thermal movement between the windings and the core axially of the machine.

* * * * *